US008648804B1

(12) United States Patent
Roberts (10) Patent No.: US 8,648,804 B1
(45) Date of Patent: Feb. 11, 2014

(54) JOYSTICK APPARATUS

(76) Inventor: Timothy Paul Roberts, Tucson, AZ (US)

( * ) Notice: Subject to any disclaimer, the term of this patent is extended or adjusted under 35 U.S.C. 154(b) by 126 days.

(21) Appl. No.: 13/410,050

(22) Filed: Mar. 1, 2012

Related U.S. Application Data (60) Provisional application No. 61/522,218, filed on Aug. 11, 2011.

(51) Int. Cl.
*G06F 3/033* (2013.01)
*G09G 5/08* (2006.01)

(52) U.S. Cl.
USPC .................................... 345/161; 345/167

(58) Field of Classification Search
USPC ................... 345/156, 157, 161–167
See application file for complete search history.

(56) References Cited

U.S. PATENT DOCUMENTS

| | | | |
|---|---|---|---|
| 6,639,581 B1 | 10/2003 | Moore et al. | 345/156 |
| 6,653,579 B2 | 11/2003 | Inoue et al. | 200/6 |
| 6,693,624 B1 | 2/2004 | Niiyama | 345/161 |
| 7,123,240 B2 | 10/2006 | Kemppinen | 345/161 |
| 2003/0160761 A1 | 8/2003 | Wu | 345/161 |
| 2007/0262959 A1 | 11/2007 | Gu | 345/161 |

OTHER PUBLICATIONS

Austriamicrosystems, "AS5013 Low Power Integrated Hall IC for Human Interface Applications" Data Sheet, Revision 1.09 (31 pgs).

*Primary Examiner* — Ricardo L Osorio
(74) *Attorney, Agent, or Firm* — Hayes Soloway P.C.

(57) ABSTRACT

An embodiment of the invention is directed to a Joystick apparatus comprising a housing for anchoring the Joystick to; a stem having an actuator connected to a first end, the stem having a second end terminating at a working tip, the stem having an intermediate portion adapted to interface with a pivot point supported by the housing; a flexible disc having a peripheral rim and a central portion, the peripheral rim being supported by the housing, the central portion being connected to the stem about the stem's pivot point; and a sensor located proximate to the working tip and being adapted to detect the motion of the working tip. A novel aspect of the invention is in the use of a flexible disc acting simultaneously as a joint and a spring, thereby simplifying construction of the Joystick.

22 Claims, 7 Drawing Sheets

JOYSTICK APPARATUS

CROSS REFERENCE TO RELATED APPLICATIONS

This application is a U.S. utility application claiming priority to and the benefit of U.S. Provisional Application Ser. No. 61/522,218, filed Aug. 11, 2011, incorporated by reference herein in its entirety.

BACKGROUND OF THE INVENTION

The present invention relates generally to interfacing with computer devices by a user, and more particularly to devices used to provide input to computer systems in the form of a Joystick.

Figure 1:
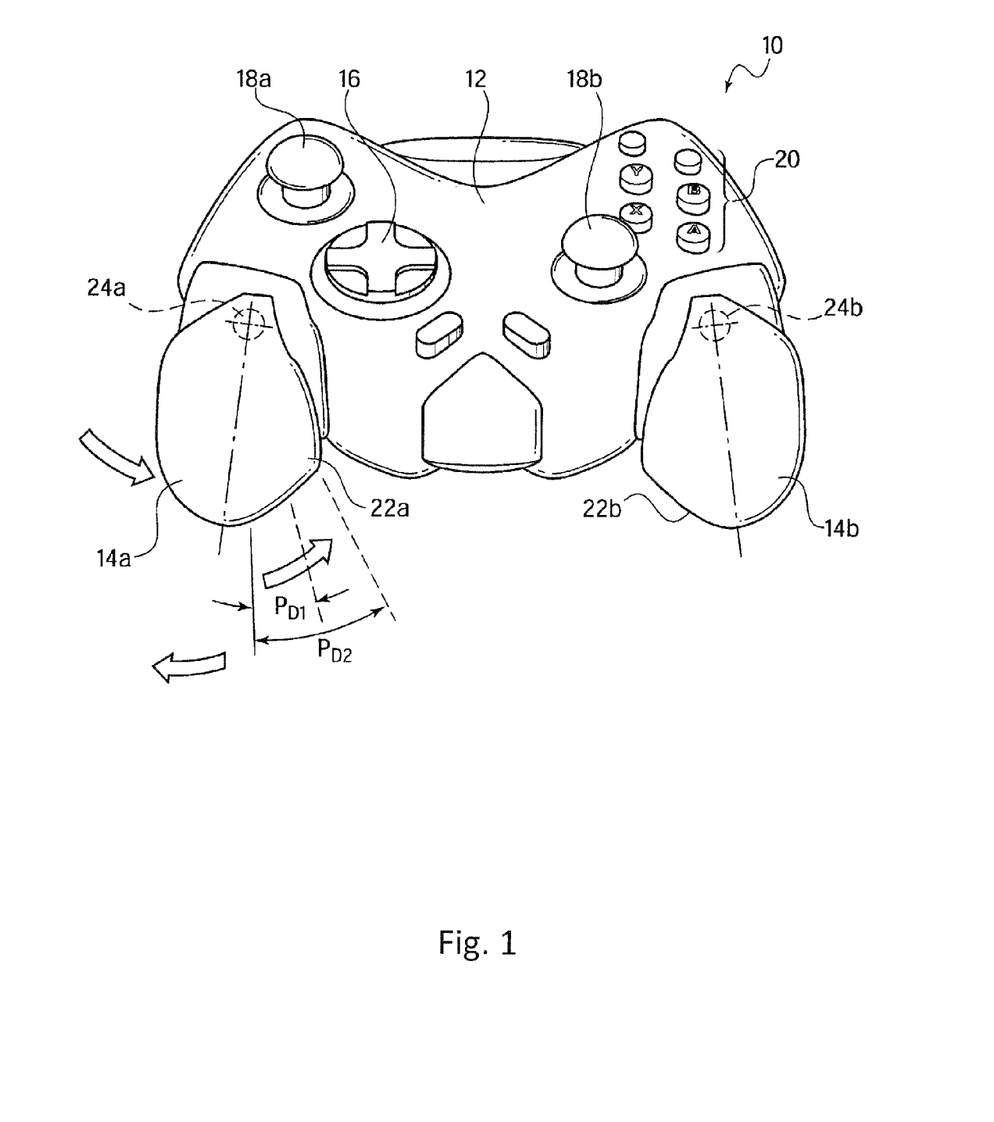
FIG. 1 is a drawing of a prior art game controller console, with various controls, including a pair of integrated Joysticks indicated as 18a, 18b.

Humans interface with electronic devices in a variety of applications, and there is a constant need for a more natural, easy-to-use, and versatile interface device. One of those applications includes interacting directly with computer generated environments. Interface devices are used extensively with computer systems in the implementation of computer-controlled games, simulations, and other applications very popular with the mass market of home consumers. In a typical implementation, a computer system such as a personal computer, home video game console, portable computer, etc., displays a graphical environment to a user on a display device. Users can interact with the displayed environment by inputting commands or data from the interface device. Popular interface devices include Joysticks, "joypad" or "gamepad" button controllers, mice, trackballs, styluses, tablets, steering wheels, pressure spheres, foot or hand pedals, or the like, that are connected to the computer system controlling the displayed environment. The computer updates the environment in response to input signals from the interface device based on the user's manipulation of a moved lever such as a Joystick handle, joypad, or mouse. The computer provides visual feedback to the user using the display screen. A typical prior art controller console with integrated controls including Joysticks 18a, b is shown in FIG. 1.

The Joystick is typically a way to communicate a movement or action that the user wishes to input to a software application that is being run. Typical Joysticks act as levers that pivot about a point known traditionally as a "fulcrum," the lever divided into two portions: the user-activated portion, and the computer interface portion. The user-activated portion extends from the fulcrum point to the user's hand or fingertip, while the computer interface portion extends from the fulcrum point to the end of the lever and into the detection area of the computer interface. Typical Joysticks are provided with some way to return the Joystick lever to center when the user releases it, or the computer interface will not be reliably zeroed. Prior art versions have utilized mechanical springs, either concentric or lateral, or elastic mounts. See e.g., US 2007/0262959A1 for an example of the former, which is incorporated by reference herein in its entirety. Springs are inherently complicated by their mere presence, are expensive, and may be displaced, permanently bent during use, or lose their elasticity due to metal fatigue. Elastic mounts may physically wear out and lack the dynamic range of a true spring. There is a continuing need for a less complex, durable and inexpensive method of mounting a Joystick lever at its pivot point yet still enabling reliable movement and return to center performance.

SUMMARY OF THE INVENTION

An embodiment of the invention is directed to a Joystick apparatus comprising a housing for anchoring the Joystick to; a stem having an actuator connected to a first end, the stem having a second end terminating at a working tip, the stem having an intermediate portion adapted to interface with a pivot point supported by the housing; a flexible disc having a peripheral rim and a central portion, the peripheral rim being supported by the housing, the central portion being connected to the stem about the stem's pivot point; and a sensor located proximate to the working tip and being adapted to detect the motion of the working tip.

Another embodiment of the invention is directed to a Joystick apparatus wherein the housing comprises a game controller or other console. The actuator may be a knob adapted for a hand, or a thumb drive adapted for manipulation by one or more fingers.

Another embodiment of the invention is a Joystick apparatus wherein the flexible disc is integral with the stem, the housing or a combination. Embodiments of the flexible disc may be comprised of a flexible material such as a polymer, a metal, or a combination of both. Embodiments of the flexible disc may be injection molded to reduce their cost. Further embodiments of the flexible disc may have a varied cross-section thickness so that the flexibility, elasticity and endurance of the apparatus may be varied at will. Embodiments of the apparatus may comprise differing sensor types for the detection of the motion of the working tip including Hall effect sensors, optical, capacitive, resistance, and photodiode sensors. In the Hall effect sensor, the working tip may have one or more magnets disposed in it.

A horizontal embodiment of the Joystick apparatus may include an optional counterweight attached to the stem proximate to the working tip when the apparatus is placed in a horizontal position with respect to the stem's orientation.

Yet a further embodiment of the Joystick apparatus includes a working tip comprising a switch.

DETAILED DESCRIPTION OF EMBODIMENTS OF THE INVENTION

An embodiment of the invention is directed to a Joystick apparatus comprising a housing for anchoring the Joystick to;

a stem having an actuator connected to a first end, the stem having a second end terminating at a working tip, the stem having an intermediate portion adapted to interface with a pivot point supported by the housing; a flexible disc having a peripheral rim and a central portion, the peripheral rim being supported by the housing, the central portion being connected to the stem about the stem's pivot point; and a sensor located proximate to the working tip and being adapted to detect the motion of the working tip. A novel aspect of the invention is in the use of a flexible disc acting simultaneously as a joint and a spring, thereby simplifying construction of the Joystick.

A "housing" as used throughout this patent is a support structure that locates and orients various components of the apparatus in relation to each other so that the Joystick is operable. For example, in one embodiment the Joystick is anchored exclusively by the flexible disc's peripheral rim to the interior of the housing. In this embodiment the housing supports the rim of the disc over the entirety of its 360 degree circumference. This function may be effected by a slot on the inside diameter of a cylindrically-shaped housing, as depicted in the Figures. However, a cylinder is not necessary, and a half-cylinder may also perform this function and still remain within the spirit and scope of this invention. The housing also functions to protect the stem from excessive motion at its first end, which could damage the flexible disc. The housing also functions to constrain the sensor and working tip in a single spatial relationship so that they will accurately and repeatably have the same relative motion with regard to each other. Any combination of design elements that fulfills these essential structural and functional features comes within the spirit and scope of the term "housing."

The term "stem" as it is used herein defines a rod or stick-like device that is used to transmit the motion from a hand or finger at a first end to the area of the sensor (second end). The stem accomplishes this function by directly transmitting the motion from the first end of the stem to the second end through a pivot point located at some chosen point on the length of the axis of the stem. Any single rod or combination of rods joined together that translate the motion from the first end to a second end comes within the spirit and scope of the term "stem." An "actuator" is simply a knob or other accommodation meant for a hand to grasp the stem and engage it. The stem has an intermediate portion where the disc will be joined to it and ranges from just below the location of the actuator to just above the location of the working tip. Theoretically, this location can vary across the entire length of the stem. Practically, the intermediate portion will range from the stem center to plus or minus 30% of the length of the stem.

The term "working tip" refers to that portion of the second end of the stem that houses the device or apparatus used in conjunction with the sensor to create a detectable signal that is directly reflective and proportional to the motion imparted by the user's manipulation of the first end of the stem.

The term "pivot point" is that point where the stem axis intersects the diameter of the flexible disc. The pivot point is not restricted to a single location on the stem by design, but may be moved up or down the stem's axis as needed to influence the degree of motion desired to be translated from the first end to the second.

One embodiment of the sensor includes a Hall effect sensor that detects motion by the changing magnetic field induced by the motion of the working tip. Another embodiment of the Joystick apparatus includes a housing comprising a game controller console into which the Joystick is integrated, although other embodiments are contemplated that are controllers for other purposes beyond gaming such as precision drafting, cartography, satellite image analysis, etc. The actuator is the handle or control surface on the end of the stem, adapted to be manipulated by a hand or fingers thereby transmitting the motion of the hand to the region of the working tip. The actuator may be a knob, a thumb shifter, or any manner of surface suited for human hand (or even foot) control.

An embodiment of the invention utilizes a flexible disc as the interface or pivot means for motion transmission from the actuator to the working tip. The term "flexible disc" defines an apparatus having two separate functions: the first is that of a generally round shape (disc) used to retain the stem in spatial relation to the housing. The second function is that of flexibility to allow the user's motion at the first end to be transmitted through the flexible disc to result in reciprocal (but not necessarily equivalent) motion at the second end. In alternate embodiments shapes other than a round disc may be equally effective in certain circumstances and design choices. The flexible disc is apportioned into two primary regions: a peripheral rim, and a central portion. The peripheral rim is just that—the rim of the disc. The central portion is that region of the disc that joins or transitions to the body of the stem. In the embodiment of a separate disc and stem, the central portion comprises the interior portion of the disc that directly contacts the surface of the stem. In the embodiment of a unitary stem and discs, the central portion is the zone where the disc and stem intersect. The term "the central portion being connected to the stem about the stem's pivot point" refers to the central portion of the disc being connected to the stem close to or in the general area of the pivot point.

Hand or finger movement of the stem via the actuator will cause the stem to pivot in the same manner a lever pivots about a point such as a fulcrum. Since one way to manufacture the apparatus is through injection molding, the flexible disc embodiment may comprise a disc that is integral with the stem as they could in theory be molded together. Alternatively, the disc may be molded integral with the housing, leaving a hole in the disc for accommodating later insertion of the stem. Yet another alternative is to mold all three—stem, disc and housing—together in a unitary embodiment. Materials the flexible disc could be made from include any number of flexible polymers with good resistance to fatigue, and metals that may be flexible yet retain their original shape when a deforming force is released. Metals that may be used include steel, memory metals such as Nitinol, etc. The flexible disc may also be comprised of two or more parts comprising multiple materials such as a combination of metal and plastic rings to take advantage of the different characteristics of both. For example, the disc may be comprised of a polymer ring at its juncture with the housing, yet transition to a metal ring at its juncture with the stem. Other embodiments of a unitary disc may have variations in their cross-sectional thickness which will also allow for differences in their flexing.

Embodiments of the invention may use different sensor types to detect the motion of the working tip, including Hall effect, capacitive, resistance, optical, and photodiode. Typically a two-dimensional detector is used. Also, a switch could be integrated into either the working tip or the surface of the PCB opposite the tip to allow for a switching or pushbutton action by pushing down on the actuator to close the switch.

Another embodiment of the invention is a horizontally-oriented Joystick. An optional counterweight is attached to the stem proximate to the working tip when the apparatus is placed in a horizontal position so that if the portion of the stem on the actuator side of the flexible disc is heavier than the opposing portion, it can be balanced with the counterweight.

The following examples are illustrations of the embodiments of the inventions discussed herein, and should not be applied so as to limit the appended claims in any manner.

Figure 2:
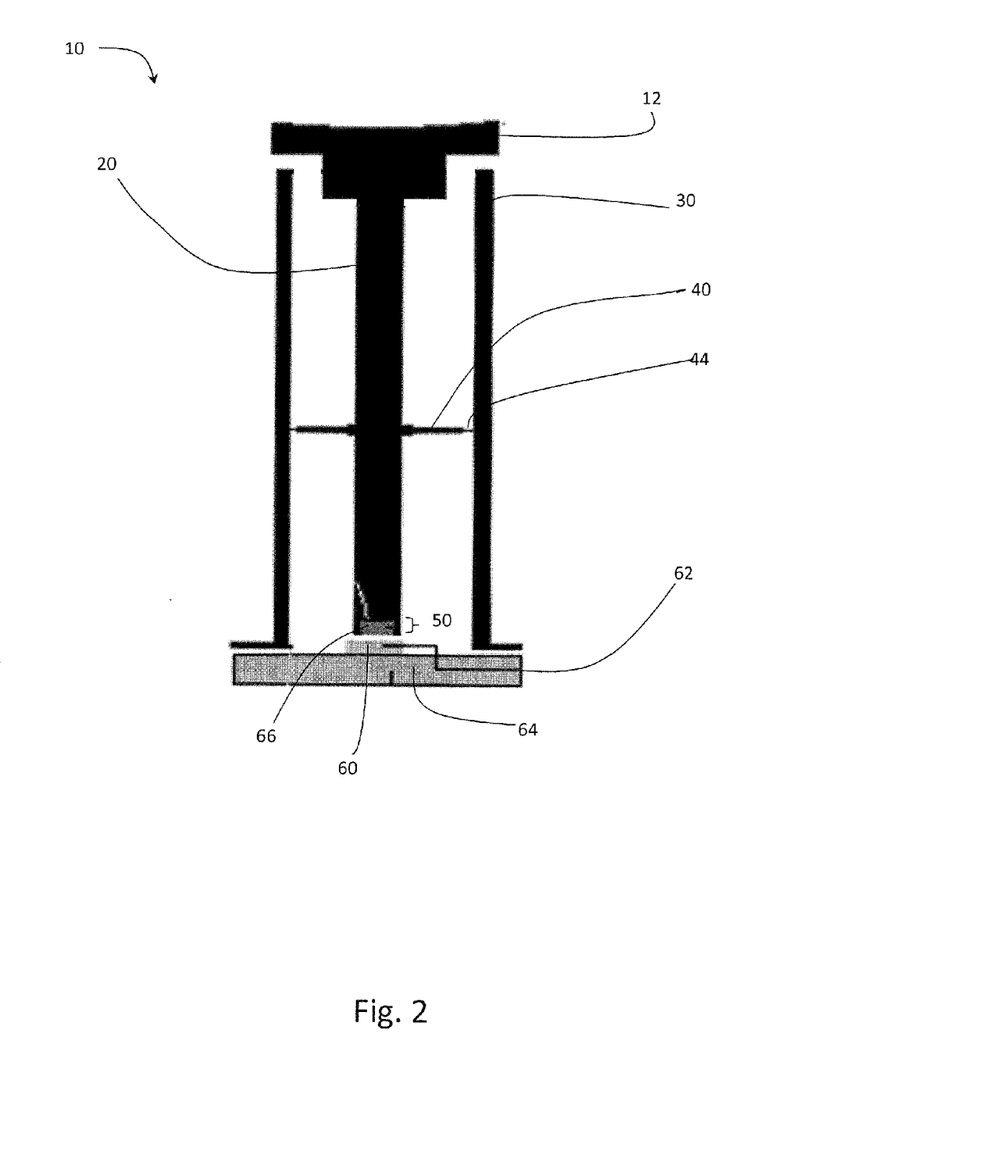
FIG. 2 is a schematic cross-sectional depiction of a first embodiment of the Joystick apparatus in the vertical orientation. The actuator, stem, housing, flexible disc, and Hall effect sensor mounted on a PC board are shown.

With regard to FIG. 2, the Joystick apparatus comprises a stem 20 with attached actuator 12. Stem 20 is free to move in an arc as with any existing Joystick when lateral pressure is exerted on actuator 12. Actuator 12 may have a shoulder 14 which functions to limit the stem's range of lateral motion. Alternatively, the same limitation may be effected by a ring attached on the inner diameter of housing 30. The movable stem 20 was attached to the housing 30 via a flexible disc 40, thereby causing the working tip 50 of the stem 20 to move proportionally, but in the opposite direction of motion applied to the actuator 12.

A sensor 60 was placed at or near the working tip 50 to measure the motion of the working tip as a user manipulates the actuator. Working tip 50 may have a magnet 66 or other device attached or embedded in it to effectuate a detection sensor response. One commercial embodiment of a Hall effect sensor that was shown to function herein is the Easy-Point™ Joystick Encoder, S/N AS5013, Austriamicrosystems AG, A-8141 Schloss Premsstraetten, Austria. The Easy-Point Joystick Encoder is a Hall effect sensor in an IC package mounted either above or below the PCB, and the magnet 66 on the working tip was attached at the center of the end of the tip, as shown in FIG. 2. To set up the sensor, working tip 50 was positioned at its neutral position so that the sensor registers the tip at home/neutral position. In other embodiments and if required by the sensor, a separate wire can be attached to the working tip to provide, for example, power for illumination of the working tip. A framework, generally a printed circuit board ("PCB") 64, supports the sensor. In yet other embodiments the working tip itself could contain a sensor package such as the Hall effect sensor, and a stationary magnet could be placed below the tip on the framework. A wire 62 connects the sensor IC to the controller's CPU.

Stem 20 has an intermediate portion adapted to interface with a pivot point supported by housing 30. Positioning of the flexible disc 40 along the intermediate portion of the axis of the stem 20 will determine the sensitivity of response of the Joystick to human touch. The pivot point is the axial position of flexible disc 40 along the axis of the housing 30. For example, if the flexible disc 40 is positioned at the middle of the stem 20 (equal lengths of the stem on either side of the disc) then the motion of the actuator 12 will be approximately mirrored at the working tip 50. If however, flexible disc 40 is moved towards working tip 50 then the actuator motion will be reduced proportionately at working tip 50. Therefore, some experimentation will be required to match the axial position of the flexible disc with the working range of motion of the sensor to optimize the sensitivity of the Joystick, and one having ordinary skill will be easily able to determine the correct combination of factors. For example, in the AS5103 Data Sheet Rev. 1.09 for the EasyPoint Joystick Encoder, it details that the maximum radius of the magnet's circle of travel is 2.0 mm. Therefore, one having ordinary skill in the art will have to determine the amount of actuator travel, in a normal range of motion for any particular Joystick under design, that translates into the 2.0 mm circle of motion at the working tip. Again, simple experimentation will reveal this relationship.

A switch 68 (not shown) can also be placed on working tip 50 or on the framework of the sensor just below the working tip 50. In the configuration of FIG. 2, the actuator would be pressed downward, thus pressing the working tip 50 of the stem 20 against the switch 68, which would be located on top of sensor 60. With certain sensing embodiments, such as magnetic detectors (Hall-effect sensors), the inward motion of a magnet at the working tip can be sensed electronically, thus creating a virtual switch. A cross-section of a flexible disc modified to support greater vertical range of motion is shown in FIG. 7C wherein a bellows or accordion-like fold has been designed into the disc. This allows greater vertical range of motion.

Figure 3:
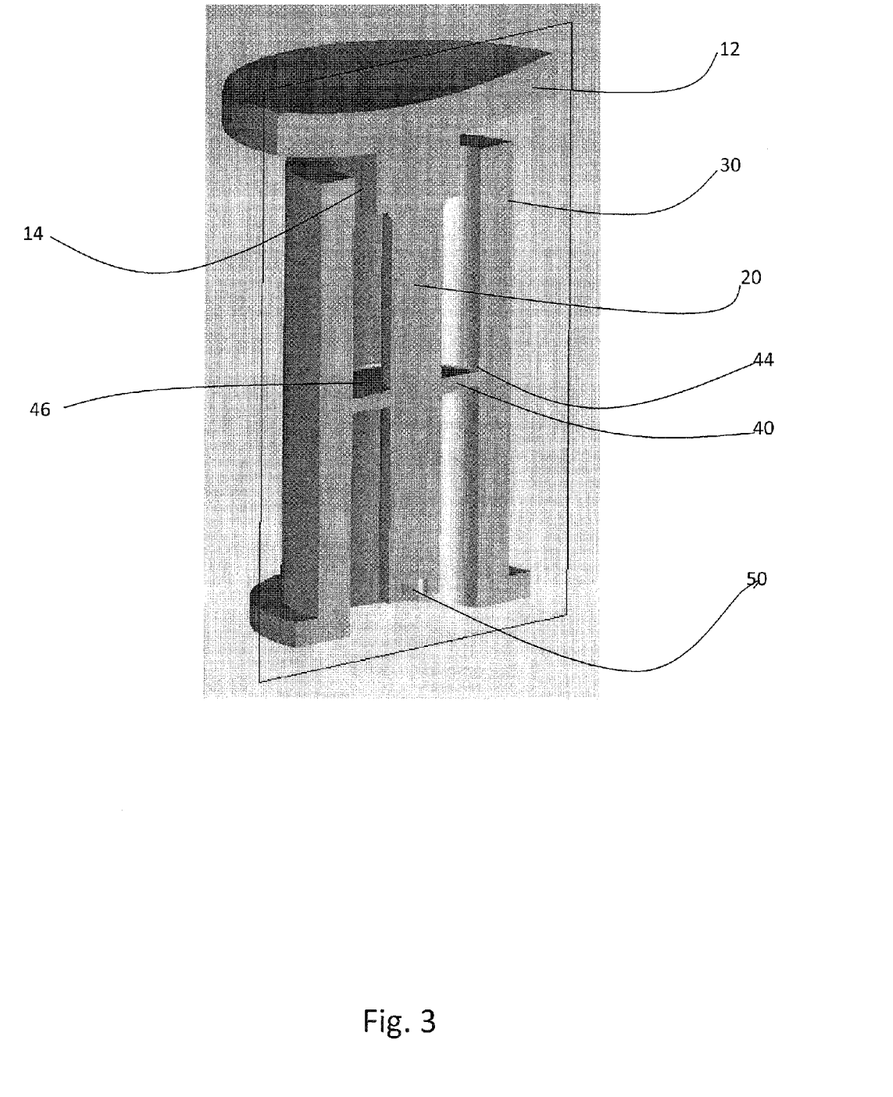
FIG. 3 is an elevational view of a cross-section taken along the longitudinal axis of a device similar to that of FIG. 2, minus the PCB, sensor and magnet, and having a flexible disc with a thicker cross-section at the central portion that at its rim.

Manufacture of the Joystick apparatus may be effected by numerous processes well-known to one of ordinary skill in the manufacturing arts. Injection molding, 3D printing (additive manufacturing or rapid prototyping), machining, and related technologies may be used singly or in steps to create the various discrete components shown herein. However, advantageously a 3D printing process was used to create a working prototype of the Joystick apparatus. An operational prototype was created using a 3D laser sintering system using NYLON® D80, followed by boiling the model in water for 5 minutes. The resulting apparatus is shown in FIG. 3. The actuator 12, shoulder stem 20, disc 40, housing 30 and base 32 were injection-molded as one unitary product. The only component left to add was the PCB with the sensor package, and the magnet for the working tip. Manufacturing in 3D simplified the overall product greatly because it reduced the total number of components to three. However, manufacturing the Joystick in a larger number of discrete components is also feasible and may be warranted for applications requiring more robust components or higher production numbers. Failure analysis results show that DELRIN is a superior product for this application if injection molding is the manufacturing method of choice.

Figure 4A:
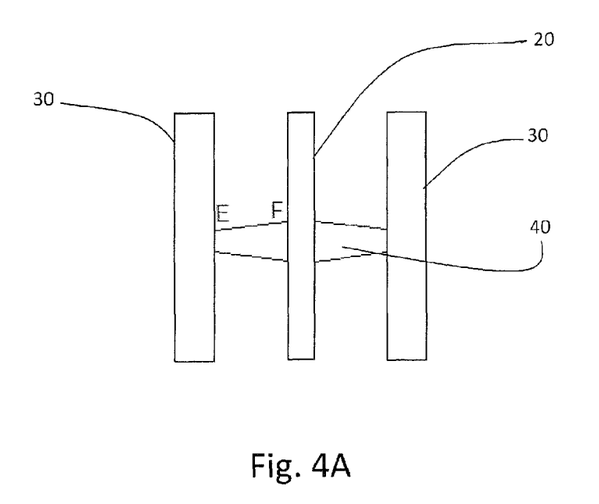
FIGS. 4A-4B are cross-sectional schematics taken along lines A-A and B-B.
Figure 4B:
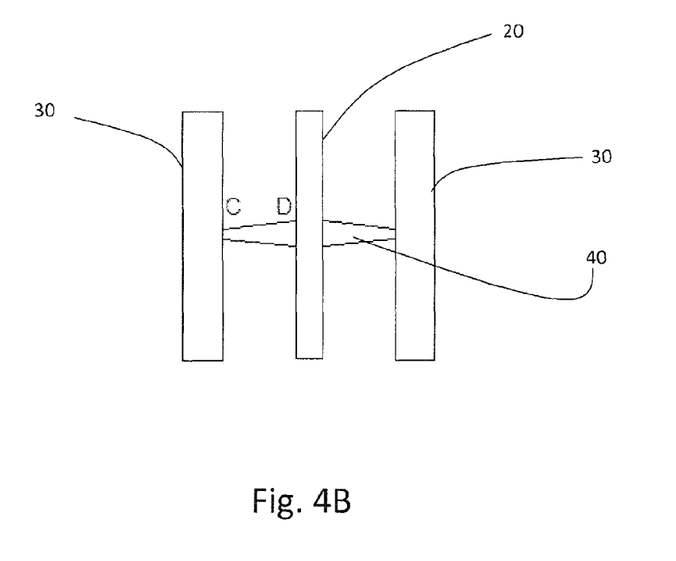
Figure 4C:
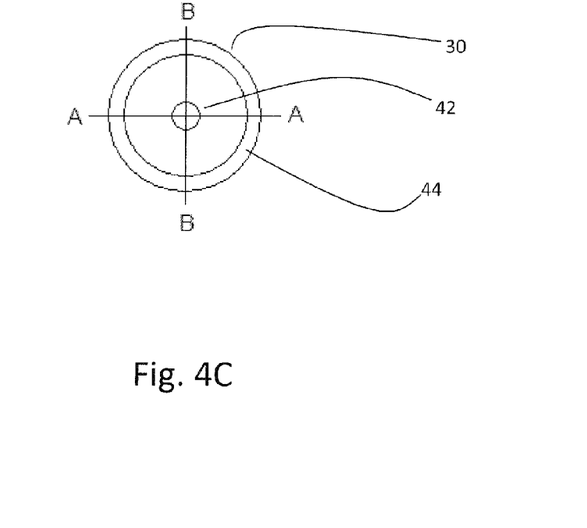
FIG. 4C is an end view of the flexible disc mounted to the housing and stem.

FIGS. 4A and 4B are schematic representations of a cross-section of a flexible disc mounted to the housing 30 and the stem 20. In one embodiment, the disc may be generally flat and have a generally circular form made from metal or plastic, and having a circular hole at its center adapted to engage the stem. The disc's outer periphery or rim 44 is adapted to engage with the housing's inside wall 34. The adaptation may take many forms, but one embodiment may involve merely seating the rim into a circular recess or groove in the inner wall of the housing in a snap-ring fashion. Another embodiment is an integral housing-disc combination where there is no need to design a junction between the housing inner wall 34 and disc rim 44. The disc has a central portion 46 which is where it engages with the outer surface of the stem 20. The same snap-ring engagement motif may also be the manner in which the central portion of the flexible disc engages the stem, which will of course require that a circular groove be formed in the stem's outer surface. However, in an integral stem-disc design, no engagement mechanism will be required.

As previously noted, one advantage of a flexible disc 40 acting to anchor the stem 20 to the housing 30 is that the flexible disc 40 effectuates two functions simultaneously—joint and spring. The joint function comprises connecting the stem 20 to the housing 30 wherever the flexible disc 40 is anchored along the longitudinal axis of the housing 30 and stem 20 thereby effecting the pivot point. The spring function is inherent in the disc if it is made from a flexible, resilient material that will deform upon the urging of the user upon the actuator 12, and then spring back to its original shape on release of the actuator 12, thus returning the stem 20 and its working tip 50 to the neutral (i.e. centered) position. Therefore, selection of the flexible disc's material is non-trivial. Steel, stainless steel, Nitinol and other nickel alloys with shape memory characteristics may be used as metallic flexible discs. Injection-molded flexible discs may be made from thermoplastic polymers, heat-induced thermosetting polymers and elastomers, which may also be useful due to their high elasticity.

Figure 7A:
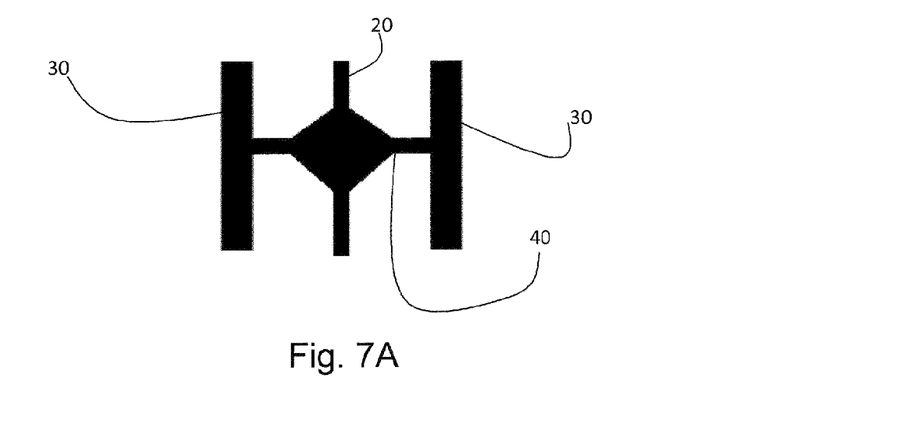
FIGS. 7A-7C are cross-sections of three alternative embodiments of a flexible disc mounted to a stem and a housing.
Figure 7B:
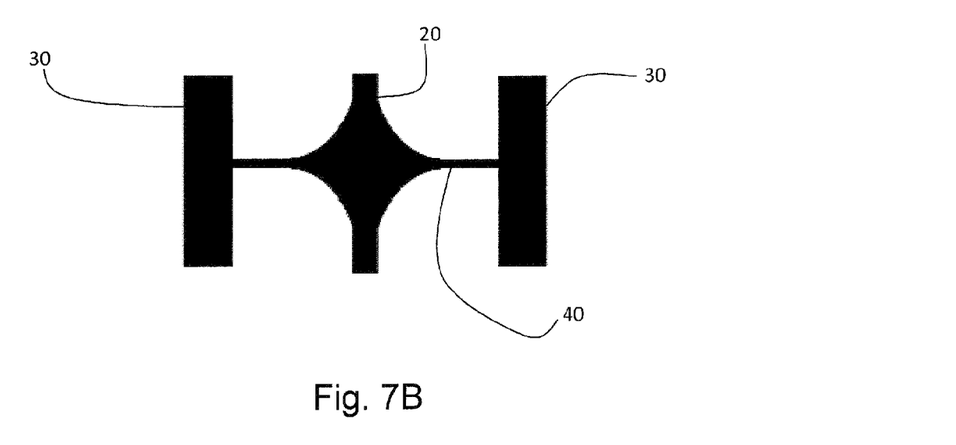
Figure 7C:
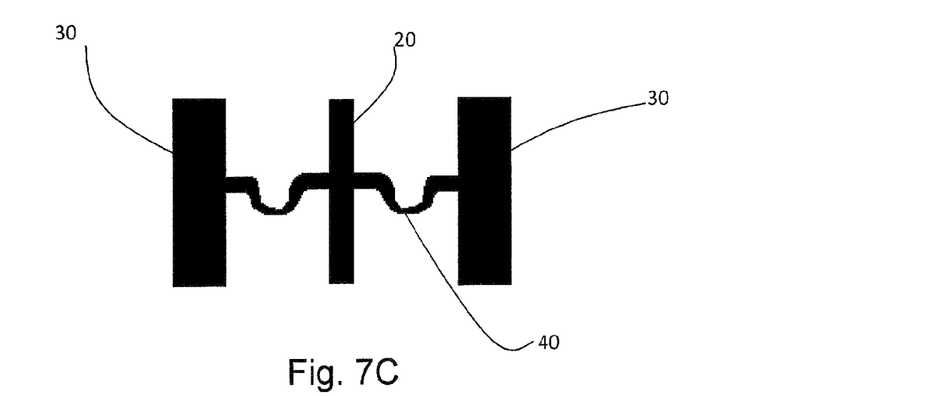

The flexible disc 40 may be the same in thickness across its entire radius, or the thickness may vary as shown in FIGS. 3-4 and FIGS. 7A-C. Varying the thickness of the flexible disc 40 will affect how and where it flexes in response to the user's urging, and also how it resists fatigue. For example, stress testing indicated that the point where the highest stresses occur is at the junction between the stem and the disc. Therefore, reinforcement of this junction will enable greater longevity of the disc. Reinforcement can be effected either by thickening this area, or by physically reinforcing the junction. Other methods of reinforcement will be apparent to one having ordinary skill in the art. Thickening the stem-disc junction will result in a disc cross-section that is thicker in the area of the stem (central portion) than at its rim. The embodiment of FIG. 7A shows a disc having generally triangular cross-sectional quadrants, while FIG. 7B shows an embodiment having generally concave cross-sections.

Figure 6A:
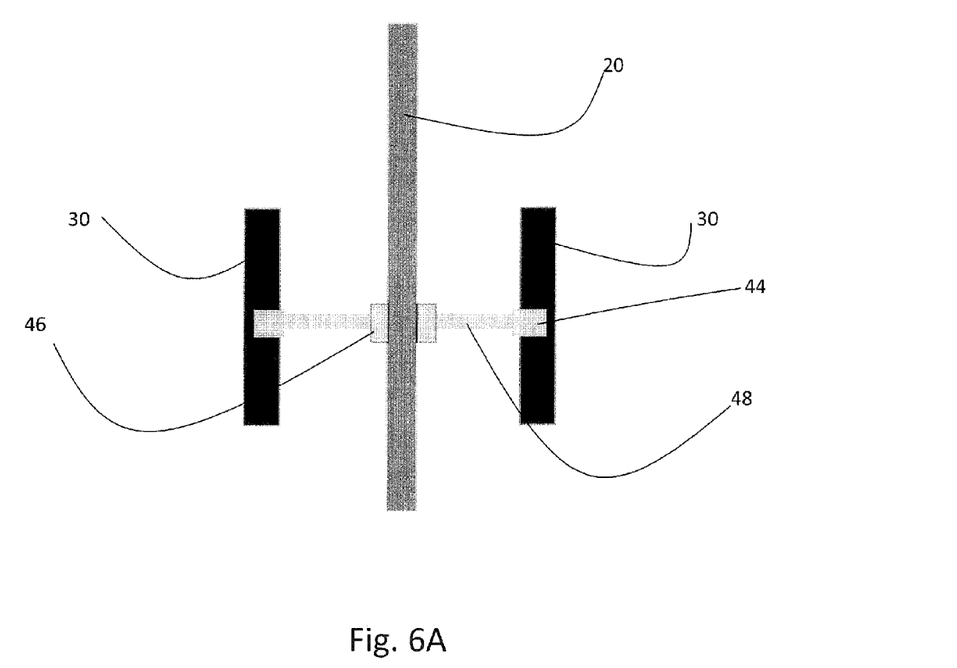
FIG. 6A is a schematic cross-sectional depiction of a Joystick apparatus having three separate components, all made from different materials, including a multi-part flexible disc.

FIG. 6A is a schematic depiction of a Joystick apparatus having three separate components, all made from different materials. The components include left and right housing sections 30, a flexible disc 40, and a stem 20. For consumer commercial applications such as a game controller, the housing is preferably made from some plastic or other polymer that is injection moldable or 3D printable. As previously described in relation to the flexible disc 40, it may be made from numerous types of materials as a single uniform component, or it may be made from combinations of component parts. This embodiment is made from metal, and is described more fully below. The third component is the stem 20, and it may be comprised of some relatively stiff yet lightweight material such as aluminum, bronze, ceramic or ceramic-metallic composite. In this embodiment, a preferred material is bronze.

Figure 6B:
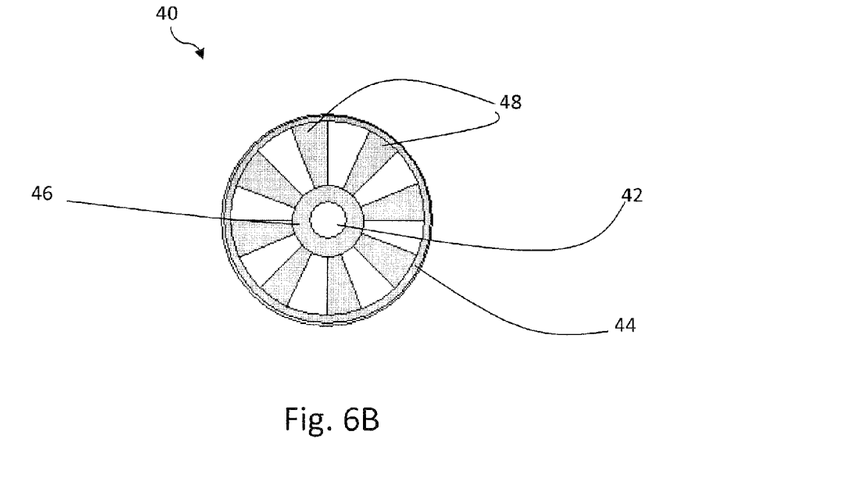
FIG. 6B is a top down perspective view of the multi-part flexible disc of FIG. 6A, separate from the actuator and housing.

FIG. 6B is a top-down schematic depiction of the flexible disc of FIG. 6A, separate from the stem and housing. This embodiment has three distinct portions: a peripheral rim 44 that is adapted to engage with the inside wall 34 of the housing; a spoke portion 48 that may be made from relatively thin spring steel or similar flexible and resilient material; and a central portion 46 that is adapted to engage the stem. Central portion 46 may be a snap-ring if metal, and will snap into place wherever it encounters a groove on stem 20.

Figure 5:
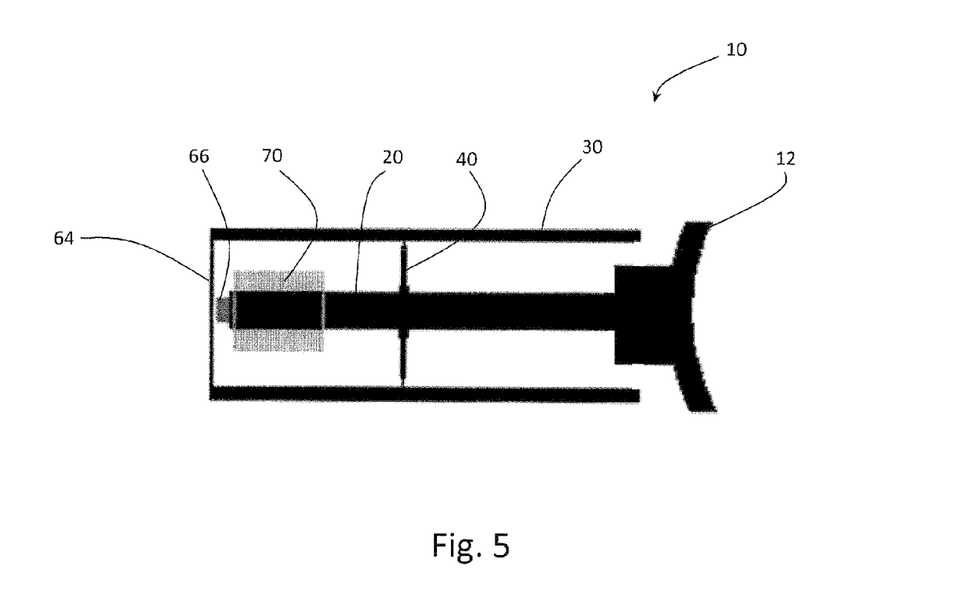
FIG. 5 is a schematic cross-sectional depiction of the first embodiment of the Joystick apparatus of FIG. 2 shown in a horizontal orientation, with the addition of a counterweight.

FIG. 5 is a schematic cross-sectional depiction of the first embodiment of the Joystick apparatus of FIG. 2 shown in a horizontal orientation, with the addition of a counterweight. An optional counterweight 70 is attached to the stem 20 proximate to the working tip 50 when the apparatus is placed in a horizontal position so that if the portion of stem 20 on the actuator side of the flexible disc is heavier than the opposing portion, it can be balanced with the counterweight. Counterweight 70 should be made of a material that does not interfere with the working of the sensor 60/magnet 66 combination. If a different type of sensor/working tip combination is used, the same consideration applies. The overall design, including the weight of the counterweight will vary depending on the design constraints including the location of the pivot point along the stem axis, the weight of the upper portion of the stem including the knob, and the interior dimension the weight must fit into, if any. The embodiment of FIG. 5 shows a hollow cylindrical sleeve that slips over the lower portion of the stem 20, however, other counterweight designs can be used so long as they allow for the requisite amount of clearance between the housing 30 and working tip 50 for the motion necessary at working tip 50.

The embodiments of the invention outlined herein have all used a flexible disc having a circular rim. The inventive concept is not so limited however, and other designs of the disc could be utilized, such as having square, rectangular or triangular disc rims. The criteria for selection of the dimensions of the rim portion of the disc are driven by the shape of the housing inner diameter. Therefore, if the housing is substantially cylindrical, then the rim of the flexible disc will be circular to accommodate it. However, if the housing is substantially square, then the rim of the flexible disc will conform to a square shape. Other shapes may also be utilized, depending on how the flexible disc is anchored to the housing. In some aspects, there may not be a recognizable "housing" per se, and the mounting for the flexible disc may be indirectly connected to the housing. The precise manner in which the flexible disc is attached to the housing for the Joystick is not critical, and all forms of attachment of the flexible disc to the housing come within the scope of the invention.

It will be understood that various modifications may be made to the embodiments disclosed herein. Therefore, the above description should not be construed as limiting, but merely as exemplifications of preferred embodiments. Those skilled in the art will envision other modifications that come within the scope and spirit of the claims appended hereto. All patents and references cited herein are explicitly incorporated by reference in their entirety.

| Table of Part Numbers | |
|---|---|
| 10 | Joystick apparatus |
| 12 | Actuator |
| 14 | Shoulder |
| 20 | Stem |
| 30 | Housing |
| 32 | Base |
| 34 | Inner Wall |
| 40 | Disc |
| 42 | Hole |
| 44 | Rim |
| 46 | central portion |
| 48 | Spokes |
| 50 | Working tip |
| 60 | Sensor |
| 62 | Sensor wire |
| 64 | PC Board |
| 66 | Magnet |
| 68 | Switch |
| 70 | Counterweight |

I claim:

1. A Joystick apparatus comprising:
   a. a housing for anchoring the Joystick to;
   b. a stem having an actuator connected to a first end, said stem having a second end terminating at a working tip, said stem having an intermediate portion adapted to interface with a pivot point supported by said housing;
   c. a flexible disc having a peripheral rim and a central portion, the peripheral rim being supported by the housing, the central portion being connected to the stem about the stem's pivot point; and
   d. a sensor located proximate to the working tip and being adapted to detect the motion of the working tip.

2. The Joystick apparatus of claim 1 wherein said housing comprises a game controller console.

3. The Joystick apparatus of claim 1 wherein said actuator is a knob adapted for a hand.

4. The Joystick apparatus of claim 1 wherein said actuator is a thumb drive adapted for manipulation by one or more fingers.

5. The Joystick apparatus of claim 1 wherein the flexible disc is integral with the stem.

6. The Joystick apparatus of claim 1 wherein the flexible disc is integral with the housing.

7. The Joystick apparatus of claim 1 wherein the flexible disc is integral with the stem and the housing.

8. The Joystick apparatus of claim 1 wherein the flexible disc comprises a polymer.

9. The Joystick apparatus of claim 1 wherein the flexible disc comprises a metal.

10. The Joystick apparatus of claim 1 wherein the flexible disc is injection-molded.

11. The Joystick apparatus of claim 1 wherein the flexible disc comprises both metal and polymer.

12. The Joystick apparatus of claim 1 wherein the cross-section of the flexible disc is thicker at the stem than at the periphery.

13. The Joystick apparatus of claim 1 wherein the cross-section of the flexible disc is substantially uniform across its diameter.

14. The Joystick apparatus of claim 1 wherein the working tip may rotate 360 degrees.

15. The Joystick apparatus of claim 1 wherein the sensor is a Hall effect sensor.

16. The Joystick apparatus of claim 1 wherein the sensor is an optical sensor.

17. The Joystick apparatus of claim 1 wherein the sensor is a photodiode sensor.

18. The Joystick apparatus of claim 1 wherein the sensor is a capacitive sensor.

19. The Joystick apparatus of claim 1 wherein the sensor is a resistive sensor.

20. The Joystick apparatus of claim 1 wherein an optional counterweight is attached to the stem proximate to the working tip when said apparatus is placed in a horizontal position.

21. The Joystick apparatus of claim 1 wherein the working tip comprises a magnet.

22. The Joystick apparatus of claim 1 wherein the working tip comprises a switch.

\* \* \* \* \*